US008758667B2

(12) United States Patent
Idler et al.

(10) Patent No.: US 8,758,667 B2
(45) Date of Patent: Jun. 24, 2014

(54) COLD PRESS AND METHOD FOR THE PRODUCTION OF GREEN COMPACTS

(75) Inventors: Rainer Idler, Waiblingen (DE); Markus Schaefer, Waiblingen (DE); Michael Feil, Berglen (DE)

(73) Assignee: Dr. Fritsch Sondermaschinen GmbH, Fellbach (DE)

( * ) Notice: Subject to any disclaimer, the term of this patent is extended or adjusted under 35 U.S.C. 154(b) by 708 days.

(21) Appl. No.: 12/925,293

(22) Filed: Oct. 18, 2010

(65) Prior Publication Data

US 2011/0100522 A1 May 5, 2011

(30) Foreign Application Priority Data

Oct. 19, 2009 (DE) ......................... 10 2009 050 846
Nov. 9, 2009 (DE) ......................... 10 2009 053 570

(51) Int. Cl.
*B22F 3/04* (2006.01)
*B29C 43/34* (2006.01)

(52) U.S. Cl.
USPC ........... 264/437; 264/443; 264/510; 264/109; 419/8; 419/11; 419/23; 425/78; 425/256

(58) Field of Classification Search
USPC ................. 264/437, 442–443, 510–517, 109; 419/8–9, 11, 23, 66; 425/78, 256, 425/344–345, 448
See application file for complete search history.

(56) References Cited

U.S. PATENT DOCUMENTS

| | | | | |
|---|---|---|---|---|
| 2,259,465 | A * | 10/1941 | Hardy | 425/78 |
| 6,241,935 | B1 * | 6/2001 | Beane et al. | 264/109 |
| 6,481,993 | B1 * | 11/2002 | Kohara et al. | 425/78 |
| 6,562,288 | B2 * | 5/2003 | Park | 425/78 |

FOREIGN PATENT DOCUMENTS

| | | | |
|---|---|---|---|
| DE | 199 23 911 | A1 | 11/2000 |
| DE | 10 2004 006 454 | A1 | 9/2005 |
| DE | 10 2004 042 889 | B4 | 10/2006 |
| EP | 0 452 618 | A1 | 10/1991 |

OTHER PUBLICATIONS

German Patent Office Examination Report dated Sep. 16, 2010 (4 pages).

* cited by examiner

*Primary Examiner* — Joseph S Del Sole
*Assistant Examiner* — Thukhanh Nguyen
(74) *Attorney, Agent, or Firm* — Flynn, Thiel, Boutell & Tanis, P.C.

(57) ABSTRACT

A cold press and a method for the production of green compacts for diamond-containing tool segments includes a tool matrix, a top ram and a bottom ram assigned to a matrix adapter from opposite directions for the purpose of compressing sinterable metal powder and diamond granules after both of these materials have been fed to the matrix adapter. Step-by-step build-up of the green compact is carried out in such a manner that after one layer of metal powder and one layer of diamond granulate have been charged, these layers are together compressed.

21 Claims, 4 Drawing Sheets

COLD PRESS AND METHOD FOR THE PRODUCTION OF GREEN COMPACTS

FIELD OF THE INVENTION AND PRIORITY

The invention relates to a cold press for the production of green compacts for diamond-containing tool segments, which cold press comprises a tool matrix and an upper ram and a lower ram that are attached to a matrix adapter on mutually opposing sides thereof in order to compact sinterable metal powder and diamond granules that can be introduced into the matrix adapter, and means for feeding the diamond granules and means for feeding the sinterable metal powder. This application claims the priorities of the German patent applications No. 10 2009 050 846.5 and 10 2009 053 570.5. The whole disclosure of these prior applications is herewith incorporated by reference into this application.

The invention further relates to a method for the production of green compacts for diamond-containing tool segments, in which method at least one layer of sinterable metal powder and at least one layer of diamond granules are superposed and compressed to form a green compact.

Finally, the invention relates to a cleaning device for a perforated matrix for retaining diamond granules by suction in a defined spatial configuration, which cleaning device comprises means for producing an air jet for cleaning a sucking/retaining surface of the perforated matrix.

BACKGROUND OF THE INVENTION

A cold press used for the production of green compacts, also referred to as blanks, for diamond-containing tool segments is known in the prior art. The cold press comprises a tool matrix, in the matrix adapter of which appropriate green compacts are compressed. For the purpose of pressing the green compacts, an upper ram is driven downwardly into the matrix adapter. The finished green compacts are then subjected to high pressure and a high temperature and are thus sintered under pressure in a pressure-sintering apparatus to form the finished tool segments.

EP 0 452 618 A1 discloses a cold press and an apparatus and a method for the production of green compacts for diamond-containing tool segments. In this reference, sinterable metal powder alternating with layers of diamond granules is combined to form a layer architecture comprising a plurality of layers of sinterable metal powder and diamond granules embedded in-between in a matrix resembling a cup or a container. After all the layers have been superposed, a pressure ram is introduced into the container-like matrix to compress the different layers of metal powder and diamond granules to form a green compact.

SUMMARY OF THE INVENTION

It is an object of the invention to provide a cold press and a method of the aforementioned type for improving the production of green compacts.

As regards the cold press, this object is achieved in that the means for feeding the diamond granules comprise a pressure-resistant diamond-granule holder which projects beyond the matrix adapter on at least two sides thereof and, for the purpose of feeding in diamond granules in a downward direction, rests on an edge of the matrix adapter and is pressed by the upper ram against the edge of the matrix adapter during operation of the cold press, while the lower ram applies pressure upwardly to the matrix adapter in the direction of the pressure-resistant diamond-granule holder. As a first result, a more precise distribution of diamond granules is achieved in the green compact, and secondly, an improved compaction of the green compact is ensured over the entire height thereof. Finally, a step-by-step build-up of a green compact is made possible. The green compacts represent blanks that are processed in a downstream pressure-sintering apparatus to form the corresponding diamond-containing tool segments. These tool segments are used for the production of cutting tools such as sawing, grinding, and milling tools or the like.

In one embodiment of the invention, a perforated matrix comprising a hole grid and a pressure element provided with a sucking/pressurizing duct are assigned to the diamond-granule holder. It is thus possible to press the diamond granules very precisely into the metal powder located beneath them. This is because the diamond-granule holder holds the diamond granules in position during the pressing operation. The diamond-granule holder and particularly the perforated matrix serve as a counterpoise for the lower ram. In a particularly advantageous manner, the diamond-granule holder rests on the upper edge of the matrix adapter and thus on the tool matrix. The pressure exerted by the upper ram on the pressure element and the perforated matrix serves to secure the position of the perforated matrix against pressure applied upwardly by the lower ram. The upper ram thus secures the diamond-granule holder on the tool matrix. Preferably, the pressure element is formed in one piece and is made of heavy-duty metal.

In a further embodiment of the invention, the sucking/pressurizing duct is open toward the perforated matrix in the operating state, and the perforated matrix comprises a hole grid, each hole of which is formed so as to allow one diamond granule to be sucked against the hole. By means of the sucking/pressurizing duct, the hole grid is subjected to negative or positive pressure for the purpose of sucking the diamond granules to each hole in a suitable spatial configuration or of releasing the same for embedding them in the sinterable metal powder.

In a further embodiment of the invention, at least two perforated matrices are provided that can be advanced to the matrix adapter as desired. Preferably, the perforated matrices comprise hole grids having different hole sizes for accepting diamond granules of different sizes. It is thus possible to provide diamond layers having different granule sizes during the build-up of layers in that different perforated matrices are alternatively advanced toward the matrix adapter. Preferably, each perforated matrix comprises a hole grid having identical hole sizes. However, the hole grids of different perforated matrices differ from each other in terms of their hole sizes so that different perforated matrices can accept diamond granules of different sizes.

In a further embodiment of the invention, the perforated matrix comprises a hole grid for retaining diamond granules in a defined spatial configuration, the base area of the perforated matrix being substantially smaller than a base area of the matrix adapter of the tool matrix, and control means are provided in order to position the perforated matrix concentrically or eccentrically in relation to the matrix adapter. It is thus possible to configure different layers for the step-by-step layer architecture in the green compact in that the spatial configuration of diamond granules that has a smaller base area than the matrix adapter and thus also a smaller base area than the metal powder poured into the matrix adapter is embedded in the metal powder such that the spatial configuration of diamond granules is displaced eccentrically toward the left or toward the right or toward the front or toward the back. These embodiments are advantageous for the production of diamond-containing tool segments that are subject to severe wear on one side due to the subsequent direction of rotation of the resulting cutting tool. The eccentric arrangement of the diamond granules can offset this unilateral wear of the tool segment in that preferably more diamond granules are present on that side of the green compact that is exposed to a greater degree of wear in the tool segment subsequently produced therefrom.

As regards the method, the object underlying the invention is achieved in that the at least one layer of sinterable metal powder and the at least one layer of diamond granules are superposed prior to compression such that the layers are offset in an asymmetrical manner. This results in the aforementioned property of increased resistance to wear.

For the purpose of providing a method for producing green compacts of the aforementioned type, the object underlying the invention is achieved in that a step-by-step build-up of the green compact is carried out such that compression is carried out after each charge consisting of one layer of metal powder and one layer of diamond granulate. This step-by-step build-up makes it possible to achieve high uniformity of compaction of the green compact and greater strength than in prior green compacts. Furthermore, this step-by-step build-up enables the layers of diamond granules to be positioned securely in the metal powder.

The term "diamond granules" is to be understood generally and includes all types of diamond fragments, diamond chips and other extremely small diamond elements. The diamond granules are produced in grain sizes ranging from very small to medium or large—depending on the intended application. In particular, the diamond granules are produced artificially.

In one embodiment of the method of the invention, a layer of diamond granules is placed on top of a layer of sinterable metal powder prior to compression, and then pressure is applied to the metal powder from below, while the layer of diamond granules is at the same time held in position at the top. In this way, the diamond granules are securely held in position in the selected spatial configuration during the pressing operation.

The invention also relates to a cleaning device for a perforated matrix for sucking and retaining diamond granules in a defined spatial configuration, which cleaning device comprises means for producing an air jet for cleaning a sucking/retaining surface of the perforated matrix.

It is an object of the invention to provide a cleaning device of such type that makes it possible to achieve easy and rapid cleaning of the perforated matrix.

This object is achieved in that the means for producing an air jet comprise a slot nozzle, the length of which is equal at least to the longitudinal or lateral dimensions of the hole grid and which, in its functional state, is directed toward a bottom surface of the perforated matrix covered with adhering diamond granules. The blow-off procedure is thus not effected through the holes of the hole grid, but instead from that side of the perforated matrix to which diamond granules of a dust-like nature or of adequate size adhere. The length of the slot nozzle is sufficiently large to ensure that an air jet extends over the entire width or length of the hole grid of the perforated matrix such that the slot nozzle can be stationarily mounted.

In one embodiment of the invention, the means for producing an air jet comprise control means for producing blowing pressures of different intensities. It is thus possible to operate the cleaning device in two different modes. In a first mode of operation, the forwarding unit, that is to say, the perforated matrix and the pressure element, is cleaned after the sucked diamond granules have been placed on top of a sinterable layer of metal powder inside the matrix adapter. For this purpose, a high pressure is applied to the forwarding unit, particularly to the pressure element. At the same time, the sucking/retaining surface of the perforated matrix is cleaned by means of the air jet under a high blowing pressure so that all of the residue is blown off from the sucking/retaining surface of the perforated matrix. In the second mode of operation, the forwarding unit is advanced to the cleaning device following suction of the diamond granules but prior to superposition of the same on the layer of metal powder inside the matrix adapter. Whilst retaining the vacuum, by means of which the diamond granules are sucked onto the holes of the hole grid, a low-pressure air jet is produced in the cleaning device so that dust or diamond-granules adhering to the regions surrounding the holes of the perforated matrix are blown off without removal of the diamond granules held by suction against the holes themselves. Thus this ensures that the diamond granules are retained in a defined spatial configuration only at the holes of the sucking/retaining surface of the perforated matrix. The forwarding unit thus cleaned is then advanced together with its perforated matrix to the matrix adapter of the cold press, and the diamond granules are placed on the awaiting layer of metal powder.

In a further embodiment of the invention, the slot nozzle is mounted so as to be displaceable along the bottom surface of the perforated matrix. Such displaceable mounting of the slot nozzle together with controlled movability of the same along the bottom surface of the perforated matrix make it possible for the air jet to be moved across the bottom surface of the perforated matrix so that the blowing operation can be carried out starting from one margin of the perforated matrix.

In a further embodiment of the invention, the slot nozzle is integral with a housing member (10) which is provided with accommodation means for the perforated matrix. This is a particularly robust design.

In a further embodiment of the invention, the accommodation means are provided with a peripheral gasket for the purpose of sealingly placing the perforated matrix on the accommodation means. This thus ensures that there is no loss of efficacy in the cleaning operation.

In a further embodiment of the invention, the housing member is produced as one piece and is made of heavy-duty metal. This particularly robust embodiment is highly suitable for accommodating and discharging the abrasive residue of diamond granules.

BRIEF DESCRIPTION OF DRAWINGS

Additional advantages and features of the invention are revealed in the claims and in the following description of a preferred exemplary embodiment of the invention explained with reference to the drawings, in which:

DETAILED DESCRIPTION

Figure 1A:
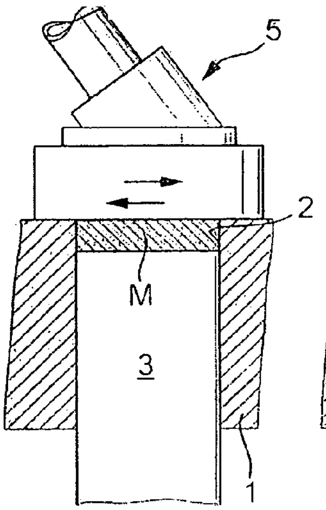
FIGS. 1*a* to 1*c* diagrammatically show, in various steps, an embodiment of a cold press of the invention comprising feeding means for sinterable metal powder and diamond granules.
Figure 1B:
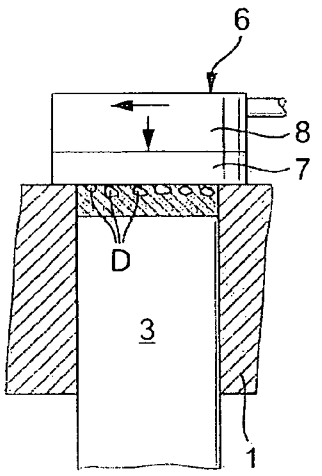
Figure 1C:
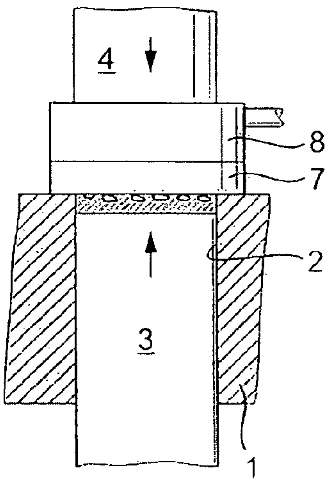

A cold press shown in FIGS. 1*a* to 2*i* serves to produce green compacts from sinterable metal powder M and diamond granules D. Green compacts of such type are then processed further in a pressure-sintering apparatus to form diamond-containing tool segments used in cutting tools for cutting or machining highly abrasive materials.

A cold press of such type comprises a tool matrix 1 that is provided with a cavity which is open at the top and at the bottom to form a matrix adapter 2. The matrix adapter 2 represents a matrix opening. The base area of the matrix adapter is equal to the base area of a green compact to be produced. The outer contour of a corresponding green compact substantially corresponds to the outer contour of a tool segment that is to be subsequently produced from this green compact.

Two pressure rams that can be downwardly and upwardly moved into the matrix adapter 2 are assigned to the same. These two pressure rams are a lower ram 3 and an upper ram 4 that are able to move into the matrix adapter 2 from the bottom and from the top respectively. A control unit (not shown) carries out the control of corresponding drive units for the pressure rams.

The cold press further comprises a filling carriage 5 as feeding means for the sinterable metal powder M, which filling carriage can be forwarded to the matrix adapter 2 by means of a guiding device (not shown) and positioned on an upper edge of the matrix adapter 2 for the purpose of pouring a suitable layer of metal powder M, that is to say, a predetermined amount of metal powder M, into the matrix adapter 2. An upper end surface of the lower ram 3 serves as the base of the matrix adapter 2. The two arrows marked in FIG. 1*a* that are assigned to the filling station 5 symbolize a corresponding guiding device for the filling station 5 that is used for advancing the filling station to the matrix adapter 2 and for withdrawing the filling station from the same. The guiding device can be provided with a drive unit and control means for the purpose of automatically advancing and withdrawing the filling station 5 and pouring a portioned charge into the matrix adapter.

As feeding means for the diamond granules D, a forwarding unit 6 is provided that consists of a diamond-granule holder 7 and a pressure element 8. A guiding device is also assigned to the diamond-granule holder 7 in order to advance the same to the matrix adapter 2 in a floating form, that is to say, at a distance from the tool matrix 1, and to lower the diamond-granule holder above the matrix adapter 2 such that a perforated matrix of the diamond-granule holder 7 is positioned at a desired location on the matrix adapter 2. The arrows shown in FIG. 1*b* indicate the corresponding motion components of the guiding device for the purpose of advancing the forwarding unit 6 and thus also the diamond-granule holder 7 to the matrix adapter 2. The withdrawal of the forwarding unit 6 is carried out in reverse order by first raising the diamond-granule holder 7 and thus the forwarding unit 6 and then withdrawing the same from the tool matrix 1 in a horizontal direction. Control means and a drive unit ensure automatic advance or withdrawal of the forwarding unit relatively to the matrix adapter.

Figure 3:
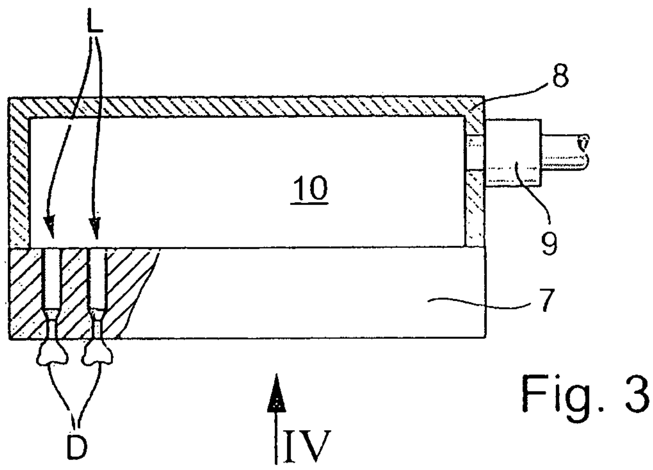
FIG. 3 shows diagrammatically a cross-section of a perforated matrix with the associated pressure element.
Figure 4:
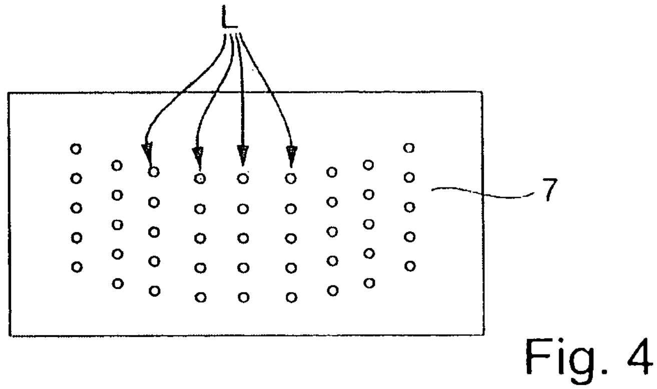
FIG. 4 shows diagrammatically a bottom view of the perforated matrix taken in the direction of the arrow IV marked in FIG. 3.

As is evident from FIGS. 3 and 4, the forwarding unit 6 is composed of the diamond-granule holder 7 and a pressure element 8, which is placed on the diamond-granule holder 7 from above and is sealingly connected to the same. In the exemplary embodiment shown, the diamond-granule holder 7 is in the form of a perforated matrix that is provided with a hole grid L. The holes of the hole grid L are in the form of passages that are open at the top and at the bottom and that taper from the top to bottom in a nozzle-like manner. The pressure element 8 comprises a chamber 10 with which the holes of the hole grid L communicate in the mounted state of the pressure element 8. The pressure element 8 is in the form of a housing and is sealingly disposed on the perforated matrix 7. The pressure element 8 is provided with a vacuum connection 9 by means of which a negative pressure can be generated in the chamber 10, which negative pressure exerts a suction effect on the holes of the hole grid L. It is thus possible to suck appropriate diamond granules D and retain them against the bottom surface of the hole grid of the diamond-granule holder 7. The vacuum connection 9 is similarly also intended for aeration or the supply of compressed air for the purpose of releasing the sucked diamond granules D. Control means control the degree of suction on, or the release of, the diamond granules D.

Figure 5:
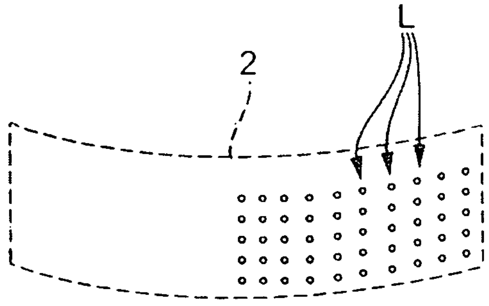
FIG. 5 shows diagrammatically a front view of a matrix adapter or a base surface of a green compact, the perforated matrix and a corresponding spatial configuration of diamond granules being oriented such that they are displaced to the right.
Figure 6:
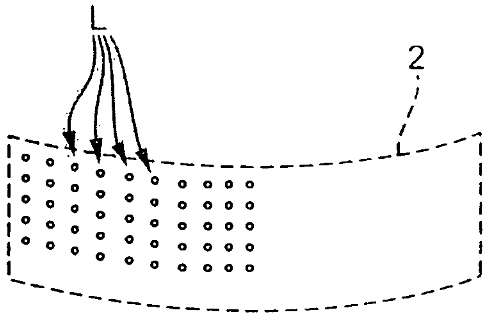
FIG. 6 shows the view shown in FIG. 5 but with the perforated matrix and the spatial configuration of diamond granules displaced to the left.

FIGS. 5 and 6 show an outer contour of the base area of the matrix adapter 2 in dashed lines. The matrix adapter 2 is provided with an arc-shaped contour that is suitable for the production of green compacts from which cutting segments are to be subsequently produced for saw blades. The diagrammatic illustrations in FIGS. 5 and 6 show that the dimensions and the base area of the hole grid L of the perforated matrix 7 are smaller than the dimensions of the base area of the matrix adapter 2. The illustration in FIGS. 5 and 6 is shown in exaggerated form for the sake of clarity. Preferably, the dimensions of the hole grid L are about 5% to 40% smaller than the dimensions of the matrix adapter 2. As a result of this ratio of the dimensions of the hole grid L on the one hand to those of the matrix adapter 2 on the other, it is possible to embed appropriate diamond granules D in the appropriate layer of metal powder M such that the diamond granules D are eccentric and thus asymmetric in relation to the base area of the matrix adapter 2. Two variants of this form of embedment are shown in FIGS. 5 and 6 by way of example. The perforated matrix 7 can naturally also be positioned in other locations relative to the matrix adapter 2, which locations enable the diamond granules D to be disposed in the metal powder such that the diamond granules D are displaced more to the center or in other directions. Naturally, it is also possible to position the diamond granules D in the metal powder by means of the perforated matrix 7 such that the diamond granules D are concentric and thus symmetrical in relation to the matrix adapter 2.

As is evident from FIGS. 1*a* to 2*i*, the production of a green compact is carried out in steps by pouring a layer of sinterable metal powder M into the matrix adapter, after which a layer of diamond granules D is embedded in the layer of metal powder, whereupon this unit consisting of a layer of metal powder and a layer of diamond granules is compacted. During this procedure, the diamond-granule holder 7 including the pressure element 8 remains in the advanced position on the upper edge of the matrix adapter 2. The upper ram 4 exerts downward pressure on the pressure-resistant pressure element 8 and thus also on the diamond-granule holder 7 so that the diamond-granule holder 7, that is the perforated matrix, is firmly supported on the upper edge of the matrix adapter 2. At the same time, the lower ram 3 is driven up from the bottom, as a result of which the diamond granules D are pressed into the layer of metal powder. The entire forwarding unit 6 is then removed and the pre-pressed unit consisting of the layer of diamond granules and the layer of metal powder is re-pressed slightly by driving the upper ram 4 into the matrix adapter 2, as shown in FIG. 2*a*. It is also possible that the procedure of driving the upper ram 4 into the matrix adapter does not bring about any re-pressing of the pre-pressed unit, but instead merely serves to press the pressed unit consisting of the layer of metal powder and the layer of diamond granules further down into the matrix adapter 2 with a simultaneous downward movement of the lower ram 3 in order to create an accommodating space for filling the matrix adapter with the next layer of metal powder M.

Figure 2A:
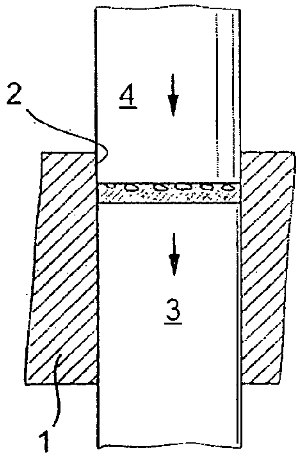
FIGS. 2*a* to 2*i* show the cold press shown in FIGS. 1*a* to 1*c* in various steps during the build-up of a green compact.
Figure 2B:
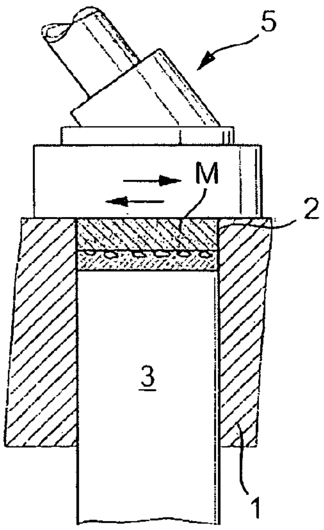
Figure 2C:
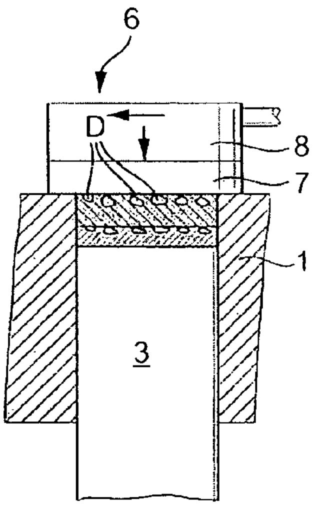
Figure 2D:
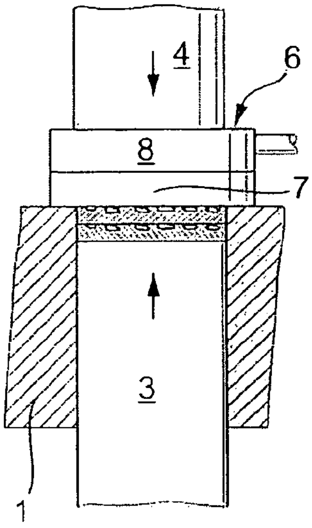
Figure 2E:
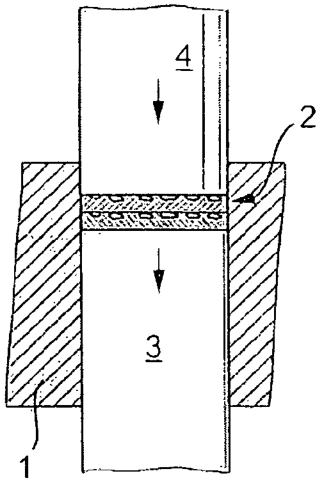
Figure 2F:
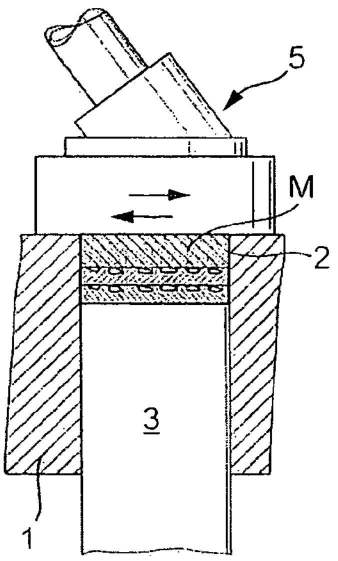
Figure 2G:
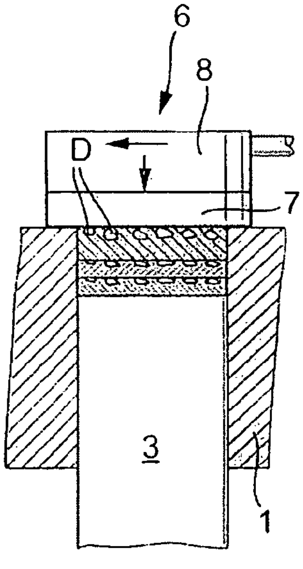
Figure 2H:
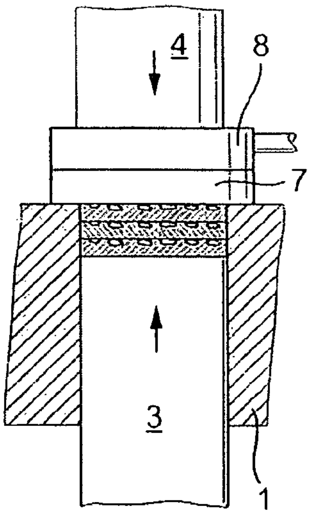

As shown in FIGS. 2*b* and 2*c*, the next layer of metal powder and the next layer of diamond granules are filled into the matrix adapter in a similar manner, and the two layers are then compacted in the same manner as shown in FIG. 2*d* by the counter-pressure exerted by the forwarding unit 6 and the diamond-granule holder 7 against an upward pressure exerted by the lower ram 3, and the layer of diamond granules is embedded in the layer of metal powder. The subsequent procedure of removing the forwarding unit 6 and moving the upper ram 4 into the matrix adapter 2 is a repetition of the method steps described above with reference to FIG. 2*a*.

Figure 2I:
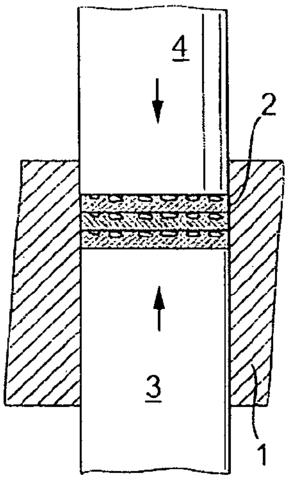

The two pressed layer structures are displaced downwardly in the matrix adapter 2 far enough to enable a third layer of metal powder M and a third layer of diamond granules D to be placed in the matrix adapter. This third layer combination of the green compact is likewise pre-pressed by a counter-pressure exerted by the combination of the perforated matrix 7 supported on the matrix tool and the upper ram 4 disposed thereabove, and an upward pressure applied by the lower ram 3. If the green compact comprises only three layer structures, as shown in FIG. 2*i*, the pre-pressing of the last layer structure is followed by a final compression of all layer combinations to form the green compact by means of a suitable pressure applied by the upper ram 4 and the lower ram 3. The green compact is then ejected upwardly by the lower ram 3 in a manner not shown in the figures and is removed for the purpose of transportation thereof to a suitable pressure-sintering apparatus.

Figure 7:
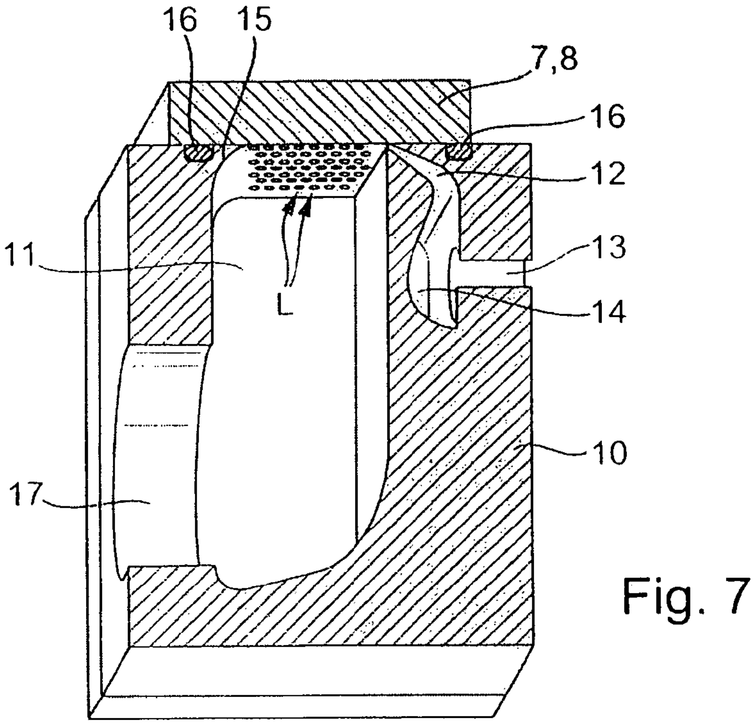
FIG. 7 shows diagrammatically a cross-sectional view of a cleaning device for a perforated matrix as shown in FIGS. 3 and 4.
Figure 8:
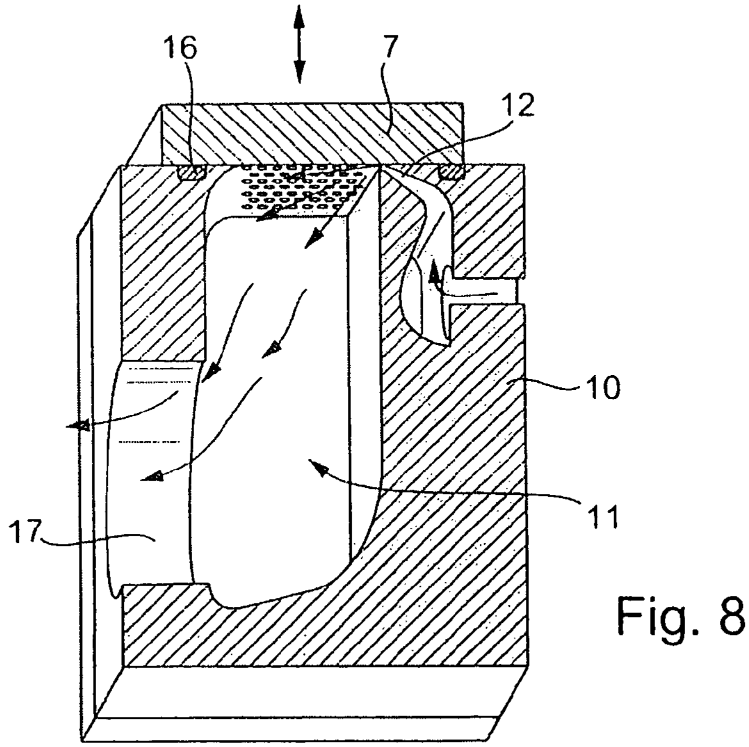
FIG. 8 illustrates diagrammatically a cleaning operation using a cleaning device as shown in FIG. 7.

The cleaning device shown in FIGS. 7 and 8 serves to clean the perforated matrix 7 and particularly to remove a residue of diamond granules such as diamond dust, diamond chips, and the like. In a first mode of operation, the entire forwarding unit 6, that is to say, the perforated matrix 7 and the pressure element 8, is placed on the cleaning device, and the chamber 10 inside the pressure element 8 is subjected to pressure for the purpose of downwardly blowing out any residue of diamond granules that may have been forced into the holes of the hole grid L. In a second mode of operation, the entire forwarding unit 6 is placed on the cleaning device in a state in which vacuum is applied to the pressure element after the diamond granules have been sucked and retained against the holes of the hole grid.

The cleaning device comprises a housing member 10 that is made of heavy-duty metal and that has an accommodating chamber 11. The accommodating chamber 11 is open at its top edge. This top edge is provided with a peripheral gasket 16 in order to make it possible to sealingly place the forwarding unit 6 and thus also the perforated matrix 7 on the cleaning device. A discharge manifold 17 for discharging compressed air and any residue of diamond granules or other impurities from the accommodating chamber 11 is connected to the lower part of the accommodating chamber 11. A broad slot nozzle 12 that is integral with the housing member 10 to form one piece therewith is provided in the housing member 10 directly below the top edge thereof. The slot nozzle 12 extends across the entire width of the hole grid L, and that side of the slot nozzle 12 that is remote from the perforated matrix 7 is open to a pressure chamber 14, in which a manifold for compressed air 13 is provided. The walls of the pressure chamber 14 and the transition to the slot nozzle 12 are preferably streamlined so as to achieve an at least mainly laminar flow of compressed air up to the outlet of the slot nozzle 12. On that side of the cleaning device that is located opposite the slot nozzle 12, a bottom edge of the receiving opening of the accommodating chamber 11 comprises a flow-guiding wall 15 that is curved concavely in order to serve as a trapping wall for the air jet produced by the slot nozzle 12 and for the residue of diamond granules and other impurities that are blown off. A bottom region of the accommodating chamber 11 is also dished toward the discharge opening 17 in order to provide a flow-guiding surface for conveying the compressed air including the residue of diamond granules and impurities toward the discharge opening. The arrows marked in FIG. 8 diagrammatically indicate the path along which the compressed air travels starting from the input into the pressure chamber 14 and continuing to the accommodating chamber 11 via the slot nozzle 12 and through the discharge opening 17 for disposal or recycling. The peripheral gasket 16 ensures that no residue of diamond granules or other dust-like impurities can escape into the environment. Preferably, the forwarding unit 7, 8 is formed as a single piece, as indicated in FIGS. 7 and 8, in that the pressure element 8 is joined to the perforated matrix 7 to form one piece therewith. However, it is also possible to place the forwarding unit shown in FIGS. 3 and 4 comprising the pressure element 8 and the perforated matrix 7 on the housing member 10 and thus on the cleaning device as shown in FIGS. 7 and 8 for the purpose of achieving the appropriate cleaning effect described above.

In a manner not shown in the figures, the cleaning device comprises control means for generating blowing pressures of different intensity. In the exemplary embodiment shown, these control means are formed such that it is possible to set variably high pressures in the pressure chamber 14. Alternatively, provision can be made, in an exemplary embodiment of the invention (not shown), to adjust the width of the slot nozzle 12 and thus to achieve variably high blowing pressures of the air jets acting on the perforated matrix. The adjustment of variably high blowing pressures enables the cleaning device to be operated in two different modes. In a first mode of operation, the air jet that is generated for the cleaning device and is discharged by way of the slot nozzle 12 serves for blowing off all diamond-granule particles that may be adhering to the sucking/retaining surface of the perforated matrix 7. Furthermore, a positive pressure is provided inside the forwarding unit 6, that is, inside the pressure element 8, so that any residue of diamond granules or other particles that have accumulated in the holes of the perforated matrix 7 are forced out downwardly.

In the second mode of operation, the forwarding unit 6 is advanced to the cleaning device such that the pressure element 8 is in a state in which it is subjected to a negative pressure after diamond granules have been sucked and retained at the holes of the hole grid L. As a result of the vacuum maintained in the pressure element 8, the diamond granules still remain in place at the lower edges of the holes of the hole grid L in the sucking/retaining surface of the perforated matrix while the forwarding unit is being advanced to the cleaning device. After the perforated matrix 7 and the pressure element 8 have been placed on the cleaning device, an air jet of relatively low pressure is produced that only blows off those residues of diamond granules and particles from the sucking/retaining surface of the perforated matrix 7 that stick to the regions around the holes of the hole grid L as a result of adhesion or the like. The air jet produced is of such low pressure that the diamond granules that are sucked by the vacuum generated in the pressure element 8 and retained at the holes of the hole grid L are not blown away. This means that the residue of diamond granules disposed around the holes is blown off and removed by the air jet so that only the diamond granules that are sucked to the holes of the perforated matrix 7 in the pattern defined by the hole grid L remain on the bottom surface of the perforated matrix 7, that is to say, on the sucking/retaining surface of the perforated matrix 7. Following this blow-off procedure, the forwarding unit 6 is advanced to the matrix adapter of the tool matrix while maintaining the state of vacuum in the pressure element, and the diamond granules adhering to the holes are placed on top of the sinterable layer of metal powder in the defined spatial configuration specified by the hole grid L.

The invention claimed is:

1. A cold press for the production of green compacts for diamond-containing tool segments, comprising a tool matrix, a top ram and a bottom ram, the top ram and the bottom ram being assigned to a matrix adapter of the tool matrix from opposite directions for compacting sinterable metal powder and diamond granules, both of the sinterable metal powder and the diamond granules being capable of being moved into said matrix adapter, and further comprising a diamond granule feeder for feeding said diamond granules and a sinterable metal powder feeder for feeding said sinterable metal powder, wherein said diamond granule feeder comprises at least one pressure-resistant diamond granulate receptacle which protrudes beyond said matrix adapter at at least two sides thereof and which, in order to enable diamond granules to be fed downwardly, rests on an edge of said matrix adapter and in an operating state is pressed by said top ram against said edge of said matrix adapter, and that said bottom ram applies pressure to said matrix adapter in an upward direction toward said pressure-resistant diamond granulate receptacle.

2. The cold press as defined in claim 1, wherein the diamond granulate receptacle comprises a perforated matrix having a hole grid and a pressure element provided with a sucking/pressurizing duct.

3. The cold press as defined in claim 2, wherein said sucking/pressurizing duct is open to said perforated matrix in the operating state, and holes of said hole grid are each adapted to allow suction of one of the diamond granules thereagainst.

4. The cold press as defined in claim 2, wherein at least two perforated matrices are provided which can be advanced to the matrix adapter.

5. The cold press as defined in claim 4, wherein said perforated matrices have hole grids with holes of different sizes for accepting diamond granules of different sizes.

6. The cold press as defined in claim 2, wherein said sucking/pressurizing duct is open to said perforated matrix in the operating state and holes of the hole grid are each designed to accept one of the diamond granules.

7. The cold press as defined in claim 2, wherein said hole grid for accommodating said diamond granules has a defined spatial configuration, a base area of said hole grid being considerably smaller than a base area of said matrix adapter of said tool matrix, and a controller is provided for positioning said perforated matrix concentrically or eccentrically in relation to said matrix adapter.

8. A method for the production of a green compact for diamond-containing tool segments, comprising providing the cold press of claim 1, superposing and compressing at least one layer of sinterable metal powder and at least one layer of diamond granules to form the green compact, wherein said at least one layer of sinterable metal powder and said at least one layer of diamond granulate are superposed with asymmetrical offset in relation to each other prior to compression.

9. A method as defined in claim 8, wherein a step-by-step build-up of said green compact is achieved by effecting compression following each charge consisting of one layer of metal powder and one layer of diamond granulate.

10. The method as defined in claim 8, wherein, prior to compression, the at least one layer of diamond granules is downwardly placed on the at least one layer of sinterable metal powder and the at least one layer of sinterable metal powder is subjected to upward pressure while the at least one layer of diamond granules is simultaneously downwardly counterpoised.

11. The cold press as defined in claim 1, further including a control unit for actuation of said top ram and said bottom ram and a controller for controlling the diamond granule feeder and said sinterable metal powder feeder, wherein said controller controls both positioning and portioning of the diamond granulates and metal powder and advancing and withdrawing said feeders to and from said tool matrix respectively.

12. The cold press as defined in claim 2, further including a cleaning device for sucking in and retaining diamond granules in a defined spatial configuration, the cleaning device comprising an air jet generator for cleaning a sucking/retaining surface of said perforated matrix, wherein said air jet generator comprises a slot nozzle, a length of which is equal to at least a longitudinal or transverse dimension of said hole grid, and which is directed toward the sucking/retaining surface of the perforated matrix covered with adhering diamond granules in a functional state.

13. The cold press as defined in claim 12, wherein said air jet generator comprises a controller for generating blowing pressures of different intensities.

14. The cold press as defined in claim 12, wherein said slot nozzle is displaceable across the sucking/retaining surface of said perforated matrix.

15. The cold press as defined in claim 12, wherein said slot nozzle is integral with a housing member which accommodates said perforated matrix.

16. The cold press as defined in claim 15, wherein said housing member is provided with a peripheral gasket for sealing said perforated matrix in relation to said housing member.

17. The cold press as defined in claim 16, wherein said housing member is a single unit made of heavy-duty metal.

18. A cold press for the production of green compacts for diamond-containing tool segments, the cold press comprising:

a tool matrix having a hole extending therethrough;

a reciprocating top ram configured to move into and out of a top of the hole;

a reciprocating bottom ram configured to reciprocate within the hole;

a diamond granule feeder for feeding diamond granules into the hole; and a sinterable metal powder feeder for feeding sinterable metal powder into the hole;

the top ram and the bottom ram being configured to reciprocate in opposite directions for compacting the sinterable metal powder and the diamond granules within the hole;

the diamond granule feeder comprising at least one pressure-resistant diamond granulate receptacle which at least partially protrudes beyond the top of the hole and which, in order to enable diamond granules to be fed downwardly, rests on an edge of the tool matrix surrounding the hole;

the diamond granule feeder being pressed by the top ram against the edge of the tool matrix surrounding the hole while the bottom ram applies pressure in an upward direction toward the at least one pressure-resistant diamond granulate receptacle to compact a mixture of the sinterable metal powder and the diamond granules between the bottom ram and the at least one pressure-resistant diamond granulate receptacle.

19. The cold press of claim 18, wherein the diamond granule feeder moves in a ram direction parallel to a reciprocating direction of the top ram and the bottom ram and in a moving direction perpendicular to the ram direction.

20. The cold press of claim 18, wherein the diamond granule feeder is spaced from the tool matrix as the diamond granule feeder is moved into position over the hole.

21. The cold press of claim 1, wherein the diamond granule feeder has only diamond granules therein and the sinterable metal powder feeder has only metal powder therein to thereby allow the diamond granule feeder to supply only diamond granules to the matrix adapter and the sinterable metal powder feeder to supply only metal powder to the matrix adapter.

* * * * *